United States Patent [19]

Himeno et al.

[11] Patent Number: 5,019,133

[45] Date of Patent: May 28, 1991

[54] METHOD FOR DYEING POLYESTER-CONTAINING FIBERS IN AN ALKALINE DYEING BATH AND DYEING ASSISTANT, AN AMINO-ACID COMPOUND

[75] Inventors: Kiyoshi Himeno, Munakata; Kazuhisa Konishi, Kitakyushu, both of Japan

[73] Assignee: Mitsubishi Kasei Corporation, Tokyo, Japan

[21] Appl. No.: 437,622

[22] Filed: Nov. 17, 1989

[30] Foreign Application Priority Data

Nov. 25, 1988 [JP] Japan .................. 63-297420

[51] Int. Cl.$^5$ ............................ D06P 1/64; D06P 3/54
[52] U.S. Cl. ........................................ 8/531; 8/532; 8/533; 8/543; 8/597; 8/602; 8/604; 8/638; 8/661; 8/675; 8/685; 8/686; 8/917; 8/922; 8/924
[58] Field of Search ............... 8/532, 533, 531, 597

[56] References Cited

U.S. PATENT DOCUMENTS 4,568,351  2/1986  Cardona et al. ............... 8/582
4,723,960  2/1988  Shirasawa et al. ............. 8/495
4,752,299  6/1988  Annen et al. .................. 8/531

FOREIGN PATENT DOCUMENTS 60-224884  11/1985  Japan .
61-152883   7/1986  Japan .
63-006180   1/1988  Japan .

Primary Examiner—A. Lionel Clingman
Attorney, Agent, or Firm—Oblon, Spivak, McClelland, Maier & Neustadt

[57] ABSTRACT

A method for dyeing polyester-containing fibers by using a disperse dye, wherein said dyeing is conducted under an alkaline condition in an aqueous medium in the presence of at least one amino acid member selected from the group consisting of an amino acid, an amino acid derivative having at least one hydrogen atom of its amino group replaced with an organic group, and an alkali metal salt of such an amino acid or amino acid derivative, in the dyeing bath, and a dyeing assistant useful for the method.

29 Claims, No Drawings

METHOD FOR DYEING POLYESTER-CONTAINING FIBERS IN AN ALKALINE DYEING BATH AND DYEING ASSISTANT, AN AMINO-ACID COMPOUND

The present invention relates to a method for dyeing polyester fibers by means of a disperse dye by an exhaustion method under an alkaline condition in an aqueous medium in good reproducibility while preventing the decomposition of the disperse dye, and a dyeing assistant useful for such a dyeing method.

It is common to conduct dyeing of polyester fibers by means of a disperse dye in a weakly acidic dyeing bath (pH 5 to 7) at a temperature of from 120° to 140° C., because the disperse dye is unstable in an alkaline dyeing bath, and it is difficult under an alkaline condition to dye polyester fibers with a constant color tone with good reproducibility.

However, in recent years, there has been a new technical demand for dyeing polyester fibers under an alkaline condition of pH 8 to 10. A first reason for this demand is that it is thereby possible to conduct alkali scouring treatment and dyeing treatment of polyester fibers simultaneously in a single step, whereby the dyeing process can be simplified. Namely, it is common to conduct alkali scouring treatment to remove an oiling agent, a sizing agent, etc. from polyester fibers by means of a scouring apparatus as a pretreatment step prior to the dyeing step to eliminate adverse effects to the dyeing process, of the oiling agent, the sizing agent, etc. used during a spinning or weaving step. The oiling agent can simply be removed by washing with a surfactant, but the sizing agent (such as a polyacrylic acid ester type or a polyvinyl alcohol type) can not be removed without using an alkali. Under these circumstances, various studies are being made in dyeing plants on a single bath scouring and dyeing process wherein the scouring treatment and the dyeing treatment are conducted in the same bath as a simplified dyeing method, from the viewpoint of energy saving and labor saving.

However, the scouring treatment usually requires a large amount of an alkali. Namely, a large amount of an alkali is required for the removal of the sizing agent, but if such an amount of an alkali and a disperse dye are present in the same bath, the disperse dye will be decomposed by the action of the alkali under the dyeing condition after the cleaning treatment i.e. at a temperature of from 120° to 140° C., whereby dyeing can not satisfactorily be conducted.

To avoid the decomposition of the disperse dye, a method and an agent have been proposed whereby an agent capable of generating an acidic substance when heated is incorporated to the dyeing bath, and the scouring treatment is conducted under an alkaline condition, and at the time of dyeing, the temperature of the dyeing bath is raised to shift the pH of the dyeing bath to an acidic side so that dyeing can be conducted without decomposing the disperse dye under the dyeing condition (e.g. Japanese Unexamined Patent Publications No. 224884/1985 and No. 17183/1985). However, the above pH shifting method has not yet been practically employed, because a slight difference in the practical conditions is influential to the dispersing rate of the agent capable of generating the acidic substance, and the reproducibility of dyeing and scouring effects is poor.

A second reason for the technical demand for dyeing under an alkaline condition is that it is thereby possible to simultaneously dye a fiber mixture of polyester fibers and cellulose fibers or nitrogen-containing fibers (such as nylon fibers) by means of both a disperse dye and a reactive dye in an alkaline medium. Namely, cellulose fibers or nitrogen-containing fibers are usually dyed by means of a reactive dye under an alkaline condition of pH 12 to 13 at a temperature of from 60° to 100° C. Thus, the dyeing conditions for polyester fibers and for cellulose fibers are clearly distinguished with respect to the pH and the temperature. Therefore, when a fiber mixture of the two fibers is to be dyed, it is necessary to divide the dyeing process into two steps and to conduct the dyeing of the respective fibers separately at different temperatures by means of separate baths having different pH ranges.

In recent years, however, there has been an attempt to dye the two fibers simultaneously in a single dyeing bath containing a disperse dye and a reactive dye. In this method, the dyeing temperature is from 120° to 140° C., and the pH is from 8 to 10 i.e. an intermediate level between the optimum pH ranges for the each fibers. In this case, it is necessary to select among disperse dyes the one which is relatively strong against alkali and to select among reactive dyes the one which is reactive even under a weakly alkaline condition and yet is stable even at a high temperature. However, even with this method, it is difficult to avoid the decomposition of the disperse dye and it is difficult to dye polyester fibers with good reproducibility.

Under these circumstances, the present inventors have conducted extensive studies for a dyeing method and a dyeing assistant to prevent the decomposition of a disperse dye during the exhaustion dyeing of polyester-containing fibers by means of a disperse dye under an alkaline condition in an aqueous medium and thereby to conduct the dyeing with good reproducibility. As a result, they have found that by adding an amino acid and/or a certain specific amino acid derivative to the dyeing bath, the disperse dye can be stabilized and dyeing can be conducted satisfactorily.

The present invention provides a method for dyeing polyester-containing fibers by using a disperse dye, wherein said dyeing is conducted under an alkaline condition in an aqueous medium in the presence of at least one amino acid member selected from the group consisting of an amino acid, an amino acid derivative having at least one hydrogen atom of its amino group replaced with an organic group, and an alkali metal salt of such an amino acid or amino acid derivative, in the dyeing bath.

Further, the present invention provides a dyeing assistant for dyeing polyester-containing fibers, which comprises water, from 2 to 50% by weight, relative to the total amount of the dyeing assistant, of an amino acid member selected from the group consisting of an amino acid, an amino acid derivative having at least one hydrogen atom of its amino group replaced with an organic group and an alkali metal salt of such an amino acid or amino acid derivative, and from 0.5 to 10% by weight, relative to the total amount of the dyeing assistant, of an alkali metal compound.

Now, the present invention will be described in detail with reference to the preferred embodiments.

The disperse dye to be used in the present invention is not particularly restricted and includes azo-type disperse dyes such as monoazo type and disazo type, and disperse dyes such as anthraquinone, phthalocyanine and copper formazan, having in their structures a substituent readily hydrolyzable in an alkaline atmosphere such as an acetyl amino group, or a cyano group or a —OCO—R group (wherein R is a $C_{1-3}$ alkyl group or a phenyl group) substituted on an aromatic ring. Particularly preferred is an azo-type dye. More specifically, disperse dyes having the structures of the following formulas, may be mentioned.

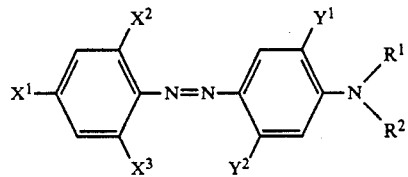
(I)

In the above formula, wherein each of $X^1$ to $X^3$ is a hydrogen atom, a lower alkyl group, a nitro group, a cyano group or a halogen atom, $Y^1$ is a hydrogen atom, a lower alkoxy group or a lower alkyl group, $Y^2$ is a hydrogen atom or an acyl amino group, each of $R^1$ and $R^2$ is a hydrogen atom or a lower alkyl group which may be substituted by a cyano group, a hydroxyl group, a halogen atom, an alkylcarbonyl group, a lower alkylcarbonyloxy group, a phenyl group, a phenoxy group or a benzoyloxy group.

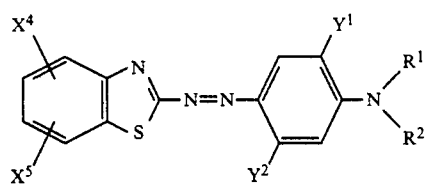
(II)

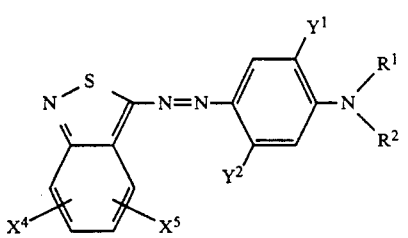
(III)

In the formulas (II) and (III), each of $X^4$ and $X^5$ is a hydrogen atom, a halogen atom or a nitro group, and $Y^1$, $Y^2$, $R^1$ and $R^2$ are as defined above.

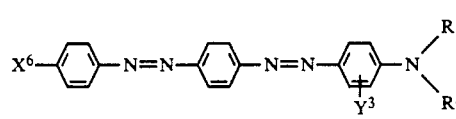
(IV)

In the above formula, $X^6$ is a hydrogen atom, a nitro group, a lower alkyl group or a halogen group, $Y^3$ is a hydrogen atom, a lower alkyl group or a lower alkoxy group, and $R^1$ and $R^2$ are as defined above.

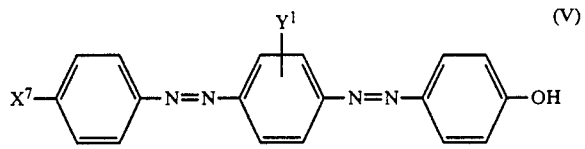
(V)

In the above formula, $X^7$ is a hydrogen atom, a halogen atom, a nitro group or a lower alkoxycarbonylamino group, and $Y^1$ is as defined above.

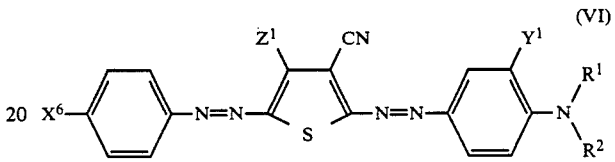
(VI)

In the above formula, $Z^1$ is a hydrogen atom or a methyl group, and $X^6$, $Y^1$, $R^1$ and $R^2$ are as defined above.

Typical specific examples of the azo-type disperse dyes useful in the present invention include, for example, disperse dyes having the following structural formulas:

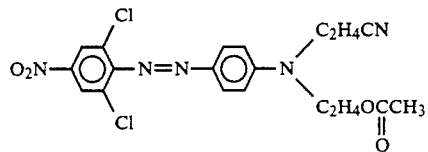
(Orange)

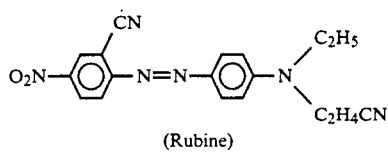
(Rubine)

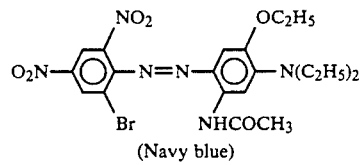
(Navy blue)

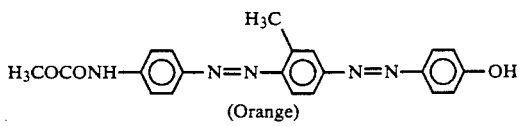
(Orange)

On the other hand, as the reactive dye to be used for dyeing a fiber mixture of polyester fibers and cellulose fibers or nitrogen-containing fibers, water soluble reactive dyes have reactive groups such as a vinyl sulfone type, a halogenotriazine type and a triazine type substituted by nicotinic acids may be mentioned: As the base structure for such reactive dyes, a monoazo type, disazo type, anthraquinone type, phthalocyanine type or copper formazan type, may usually be used. As such a reactive dye useful for dyeing such a fiber mixture, commercially available dyes stable at a high temperature such as Kayacelone React Series, tradename, manufactured by Nihon Kayaku K. K., may be employed.

The method for dyeing polyester-containing fibers in the present invention includes (1) a dyeing method combined with alkali scouring treatment of polyester fibers, and (2) a method for dyeing a fiber mixture of polyester fibers and cellulose fibers or the like in the same dyeing bath. However, in each case, the dyeing method is exhaustion dyeing from an aqueous medium, and the pH of the dyeing bath is in an alkaline region. The pH of the dyeing bath is usually preferably within a range of from 8 to 11. Namely, it is common that dyeing by means of a usual disperse dye is conducted under an weakly acidic condition, but the present invention is directed to dyeing under the alkaline condition only.

As a pH controlling agent, an alkali metal compound such as sodium hydroxide, potassium hydroxide, sodium carbonate or sodium hydrogen carbonate may usually used. Preferably, sodium hydroxide is used.

In the present invention, it is essential that an amino acid, a certain amino acid derivative or an alkali metal salt of such an amino acid or an amino acid derivative, is present in the dyeing bath for the exhaustion dyeing of polyester-containing fibers under such an alkaline condition.

The type of the amino acid used in the present invention may be a neutral amino acid such as glycine, alanine, aminobutyric acid or aminocaproic acid, an acidic amino acid such as aspartic acid or glutamic acid and a basic amino acid such as lysine or arginine. Among them, glycine, alanine or glutamic acid is preferred, and glycine and glutamic acid is more preferred. Particularly preferred is glycine.

The amino acid derivative may be a compound having at least one hydrogen atom of an amino group of an amino acid replaced with an organic group. Namely, it is a compound having one or two, preferably two, hydrogen atoms in the amino group replaced with an organic group, yet the amino acid moiety of such an amino acid derivative has substantially the same structure as the above-mentioned amino acid. Further, with respect to an amino acid having two or more amino groups, it is sufficient that at least one hydrogen atom of one of the amino groups is replaced with an organic group. However, when used for dyeing a fiber mixture of polyester fibers and cellulose fibers or the like, it is necessary that all hydrogen atoms of all amino groups be replaced. As the amino acid moiety of such an amino acid derivative, amino acids as mentioned above may be employed. Preferably a neutral amino acid such as glycine or alanine, and glutamic acid are used. More preferred is a neutral amino acid such as glycine or alanine. Glycine is particularly preferred. There is no particular restriction as to the substituent for the amino acid, so long as it does not impair the water solubility of the amino acid derivative or it does not provide adverse effects in the dyeing bath. It is usually an alkyl group, an alkoxyalkyl group, a hydroxyalkyl group, a cyanoalkyl group, an acyl group, an allyl group, a polyalkyleneoxide group (n=2 to 4) or an alkyl ether polyalkyleneoxide group (n=2 to 4). Among them, a $C_{1-4}$ alkyl group such as a methyl group, an ethyl group or propyl group; a $C_{1-4}$ alkoxy $C_{1-4}$ alkyl group such as a methoxymethyl group, a methoxyethyl group or an ethoxyethyl group; a $C_{1-4}$ hydroxyalkyl group such as a hydroxyethyl group or hydroxypropyl group; a $C_{1-4}$ cyanoalkyl group such as a cyanomethyl group or a cyanoethyl group; an acyl group such as an acetyl group; an allyl group such as an alkenyl group; a poly lower alkyleneoxide group (n=2 to 4); and a lower alkyl ether poly lower alkyleneoxide group (n=2 to 4), are 5 preferred. Particularly preferred are a $C_{1-4}$ alkyl group, a $C_{1-4}$ hydroxyalkyl group and a $C_{1-4}$ alkoxy $C_{1-4}$ alkyl group. As the amino acid derivative, N,N-dimethylglycine, N-methylglycine, N,N-bishydroxyethylglycine and N-methylaniline are preferred as specific examples. Particularly preferred is N,N-bishydroxyglycine.

The alkali metal salt of such an amino acid or an amino acid derivative is usually a sodium salt. In the present invention, as an amino acid or an amino acid derivative is added in an alkaline medium, such an acid or acid derivative will be present in the form of an alkali metal salt in the system.

When polyester fibers are to be dyed alone, both the amino acid and the amino acid derivative are effective. Whereas, when a fiber mixture of polyester fibers and cellulose fibers is to be dyed in the same bath, use of an amino acid is not advisable, and it is necessary to use an amino acid derivative having all hydrogen atoms of its amino group replaced with organic groups and/or an alkaline metal salt thereof, because an amino acid and amino acid derivative having an unsubstituted amino group is likely to adversely affect the reactive dye, whereby the dyeing of cellulose fibers tends to be inferior. There is no particular restriction as to the amino acid derivative useful for dyeing such a fiber mixture, so long as it is an amino acid derivative having all hydrogen atoms of its amino group replaced with organic groups. Preferred amino acid derivatives are N,N-dimethylglycine and N,N-bishydroxyethylglycine. Particularly preferred is N,N-bishydroxyethylglycine.

The amount of such an amino acid or an amino acid derivative, or an alkali metal salt thereof, is usually from 0.02 to 0.8 g/l, preferably from 0.05 to 0.4 g/l, in the dyeing bath from the viewpoint of the effects for preventing the decomposition of the disperse dye.

The dyeing method of the present invention may be applied to a woven fabric, a knitted fabric or a nonwoven fabric made of polyester fibers, or polyester fibers and other fibers or to yarns of such fibers. As the above-mentioned other fibers, cellulose fibers such as cotton, hemp or rayon, and nitrogen-containing fibers such as nylon, wool or silk, may be mentioned.

The dyeing may be conducted, as mentioned above, under an alkaline condition, preferably in a range of pH 8 to 11, more preferably pH 8 to 10, usually under a pressure which is commonly applied for dyeing polyester fibers at a temperature of from 120° to 140° C. To conduct the dyeing method of the present invention, it is preferred to add a dyeing assistant which usually comprises water, from 2 to 50% by weight, relative to the total amount of the dyeing assistant, of the above-mentioned amino acid member and from 0.5 to 10% by weight, relative to the total amount of the dyeing assistant, of an alkali metal compound, preferably sodium hydroxide, to the dyeing bath so that the pH of the dyeing bath and the content of the amino acid member of the dyeing bath will be within the above-mentioned ranges, to initiate the dyeing treatment.

According to the dyeing method of the present invention, it is possible to conduct post treatment such as antistatic treatment or softening treatment which is commonly applied to fibers after dyeing in accordance with a usual dyeing method.

According to the present invention, the above-mentioned amino acid member is present in the dyeing bath, whereby dyeing of polyester fibers which used to be conducted under a weakly acidic condition can be conducted under an alkaline condition with good reproducibility while preventing the decomposition of the disperse dye. Thus, a single bath scouring and dyeing method for polyester fabrics has been made possible, which used to be difficult to adopt on an industrial scale by the conventional techniques. Further, this method is suitable also for a single bath dyeing method wherein a fiber mixture of polyester fibers and cellulose fibers are dyed in the same dyeing bath using both a disperse dye and a reactive dye. Therefore, the present invention is extremely important for the dyeing industry.

The mechanism of such an action of the amino acid member has not yet been clearly understood. At present, such an action is believed to be derived from the buffering effect, chelating effect, etc. of the amino acid member.

Further, the dyeing under an alkaline condition has an additional merit that a polyester oligomer precipitating in the dyeing bath from the interior of the fibers under the dyeing condition will dissolve in an alkaline dyeing bath, whereby a trouble (such as tarring or blooming) caused by the precipitated oligomer as observed in the case of dyeing under an acidic condition, can be prevented.

Now, the present invention will be described in further detail with reference to Examples. However, it should be understood that the present invention is by no means restricted by such specific Examples.

EXAMPLES 1 TO 10 AND REFERENCE EXAMPLE 1

Twenty parts of a disperse dye of the formula (A), (B) or (C) was slurried by adding 40 parts of a naphthalene sulfonic acid-formalin condensation product, 40 parts of sodium lignin sulfonate and water, and thoroughly pulverized by means of a sand mill. Then, each slurry was spray-dried to obtain a disperse dye composition.

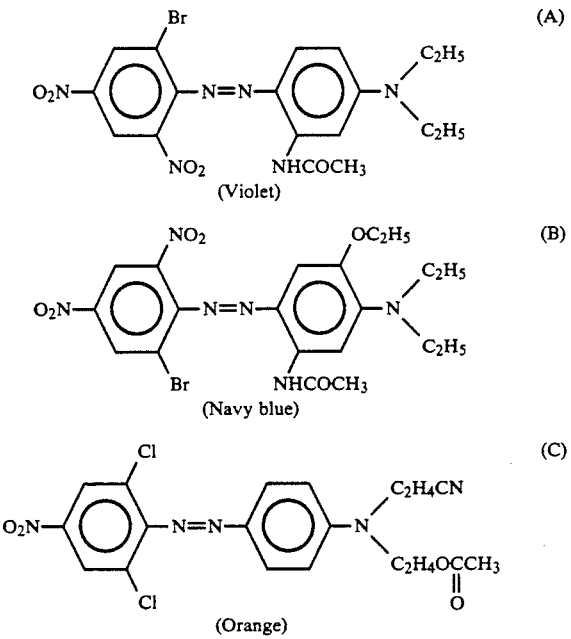

The disperse dye compositions containing disperse dyes of the formulas (A), (B) and (C), respectively, were mixed in a weight ratio of 4:2:4 to obtain a mixture (black product) of the disperse dye compositions. By using this mixture in an amount of 4% by weight relative to the fabric to be dyed and using 0.5 g/l of a leveling agent (Diaserver ® LR-PSL, tradename, manufactured by Mitsubishi Kasei Corporation) relative to the dyeing bath as a dyeing assistant and an amino acid derivative having hydrogen atoms of its amino group replaced as shown in Table 1 in an amount as identified in Table 1 as an additive and by controlling the pH of the dyeing bath to 9.5 with an alkali as identified in Table 1, a non-scoured polyester fabric Tropical (tradename, manufactured by Toray Industries, Inc.) was dyed at a bath ratio of 1:10 at a dyeing temperature of 130° C. for 60 minutes. Then, the fabric was washed and dried in a usual manner to obtain a dyed fabric.

As a standard for evaluation of the dyed fabric, the dyeing bath was prepared in the same manner as above except that no amino acid derivative was used, and acetic acid and sodium acetate were used to adjust the dyeing bath to pH 5.0 (weakly acidic) which is commonly employed for dyeing polyester fibers, followed by dyeing in the same manner as above (Reference Example 1). By using the dyed fabric obtained in Reference Example 1 as the standard, the dyeing results of each dyed fabric was evaluated. The results are shown in Table 1.

The evaluation method of each dyed fabric was as follows.

Evaluation method

Surface density: The reflectance of the dyed fabric was measured by a spectrophotometer (MS-2020 manufactured by Macbeth Company), and the value $\theta$ was calculated in accordance with DIN 6164 (DIN color specification) and represented by a relative value based on the value of the Reference Example 1 being 100.

Difference in color hue: The reflectance of the dyed fabric was measured by a spectrophotometer (MS-2020, manufactured by Macbeth Company), and the difference in color hue $\Delta E$ from the dyed fabric obtained in Reference Example 1 was obtained from CIEL*a*b*. The larger the numerical value of $\Delta E$, the more different the color. As an index for color difference of the dyed fabric, $\Delta E$ being not higher than 1.0 is acceptable.

Fiber surface condition: The sizing agent remaining on the fiber surface and the sticking condition of a polyester oligomer on the surface are evaluated by a scanning electron microscope.

COMPARATIVE EXAMPLE 1

Dyeing was conducted in the same manner as in Example except that sodium bicarbonate and soda ash were employed as the alkali to maintain the pH of the dyeing bath to a level of 9.5 and the amino acid derivative was not added, and the evaluation of the results was conducted in the same manner as in Example 1. The results are shown in Table 1.

COMPARATIVE EXAMPLE 2

Dyeing was conducted in the same manner as in Comparative Example 1 except that sodium hydroxide was used instead of sodium bicarbonate and soda ash as the alkali, and the evaluation of the results were conducted in the same manner as in Comparative Example 1. The results are shown in Table 1. In this method, although the initial pH of the dyeing bath was adjusted to 9.5, the pH at the completion was as low as about 6.0. Since sodium hydroxide is a strong alkali, a small amount of sodium hydroxide was used to control the initial pH to 9.5, whereby this small amount of alkali was probably consumed by the polyester oligomer or sizing agent.

the present invention wherein non-scoured polyester was dyed under an alkaline condition in the presence of an amino acid derivative, the surface density and the color hue were substantially equal to Reference Exam-

TABLE 1

| | Dyeing conditions | | | | Dyed fabric | | | |
| | | Amino acid derivatives | | | | | Differences in color hue from standars | |
| Examples | pH | Substituent of the amino group | Amino acid | (g/l) | Alkali | Surface density (%) | Difference in color hue (ΔE) | Visual evaluation | Fiber surface condition |
|---|---|---|---|---|---|---|---|---|---|
| Example 1 | 9.5 | Dimethyl | Glycine | 0.4 | NaOH | 99 | 0.40 | Substantially equal | Good |
| Example 2 | 9.5 | Dimethyl | Glycine | 0.2 | NaOH | 100 | 0.31 | Substantially equal | Good |
| Example 3 | 9.5 | Dimethyl | Glycine | 0.05 | NaOH | 100 | 0.22 | Substantially equal | Good |
| Example 4 | 9.5 | Monomethyl | Glycine | 0.2 | NaOH | 100 | 0.35 | Substantially equal | Good |
| Example 5 | 9.5 | Monomethyl | Glycine | 0.1 | NaOH | 100 | 0.24 | Substantially equal | Good |
| Example 6 | 9.5 | Bishydroxyethyl | Glycine | 0.4 | NaOH | 100 | 0.29 | Substantially equal | Good |
| Example 7 | 9.5 | Bishydroxyethyl | Glycine | 0.2 | NaOH | 100 | 0.23 | Substantially equal | Good |
| Example 8 | 9.5 | Bishydroxyethyl | Glycine | 0.05 | NaOH | 100 | 0.20 | Substantially equal | Good |
| Example 9 | 9.5 | Monomethyl | Alanine | 0.2 | NaOH | 99 | 0.32 | Substantially equal | Good |
| Example 10 | 9.5 | Monomethyl | Alanine | 0.1 | NaOH | 100 | 0.16 | Substantially equal | Good |
| Comparative Example 1 | 9.5 | — | — | — | Sodium bicarbonate and soda ash*[1] | 90 | 10.77 | Reddish | Good |
| Comparative Example 2 | 9.5-6.0 | — | — | — | NaOH | 100 | 0.13 | Substantially equal | No good |
| Reference Example 1 (Standard) | 5.0 | — | — | — | Acetic acid and sodium acetate*[2] | 100 (Standard) | Standard | Standard | No good |

*[1]Sodium bicarbonate and soda ash (anhydrous): 1 g/l of sodium bicarbonate and 0.15 g/l of soda ash
*[2]Acetic acid and sodium acetate: 0.2 g/l of acetic acid and 0.69 g/l of sodium acetate It is evident from the results of Table 1 that in Reference Example 1 wherein non-scoured polyester was dyed under a weakly acidic condition as in the conventional method of dyeing polyester, the surface condition of the fibers was inferior as cleaning was not carried out. In Comparative Example 1 wherein non-scoured polyester was dyed under an alkaline condition without using an amino acid derivative, the surface density of the dyed fabric was inferior, and the difference in the color hue was substantial, although the surface condition of the fibers was good. Further, in Comparative Example 2, wherein sodium hydroxide was used as the alkali as in Examples, but no amino acid derivative was used, the pH of the dyeing bath dropped during the dyeing operation, and the scouring treatment was not adequately conducted, whereby the surface condition of the fibers was inferior, although the surface density of the dyed fabric and the color hue were substantially equal to Reference Example 1. Whereas, in Examples of ple 1, and yet the surface condition of fibers was good, whereby it is apparent that the scouring and dyeing were carried out simultaneously.

EXAMPLES 11 TO 55

Dyeing was conducted in the same manner as in Example 1 except that instead of the mixture of disperse dye compositions of the formulas (A) to (C), each of the disperse dye compositions prepared in the same manner as in Example 1 and shown in Table 2, was used in an amount of 2% by weight relative to the fabric to be dyed.

Evaluation of the results was made by using as the standard a fabric dyed with each dye under a weakly acidic condition (pH =5). The surface density, the color hue and the surface condition of fibers were evaluated relative to those of the standard in the same manner as in Example 1.

TABLE 2

| | | Dyed fabric | | | |
| | | | Differences in color hue from standards | | |
| Example Nos. | Structural formula (Color) | Surface density | Difference in color hue (ΔE) | Visual evaluation | Fiber Surface condition |
|---|---|---|---|---|---|
| 11 | <br>(Brown) | 100 | 0.40 | Substantially equal | Good |

TABLE 2-continued

| Example Nos. | Structural formula (Color) | Surface density | Difference in color hue (ΔE) | Visual evaluation | Fiber Surface condition |
|---|---|---|---|---|---|
| 12 | (Structure with Cl, O₂N, N=N, N(C₂H₅)(C₂H₄CN)) (Red) | 100 | 0.24 | Substantially equal | Good |
| 13 | (Structure with NO₂, O₂N, Br, OCH₃, NHCOCH₃, N(C₂H₅)₂) (Blue) | 100 | 0.41 | Substantially equal | Good |
| 14 | (Structure with Br, O₂N, NO₂, NHCOCH₃, N(C₂H₅)₂) (Blue) | 100 | 0.36 | Substantially equal | Good |
| 15 | (Structure with Cl, O₂N, Cl, N(C₂H₄CN)₂) (Yellow) | 100 | 0.30 | Substantially equal | Good |
| 16 | (Structure with Br, O₂N, Br, N(C₂H₅)(C₂H₄CN)) (Brown) | 100 | 0.31 | Substantially equal | Good |
| 17 | (Structure with Cl, O₂N, Cl, N(C₂H₅)(C₂H₄CN)) (Brown) | 100 | 0.30 | Substantially equal | Good |
| 18 | (Benzothiazole with Br, Br, N=N, N(C₂H₅)(C₂H₄CN)) (Red) | 100 | 0.19 | Substantially equal | Good |
| 19 | (Benzothiazole with Cl, Cl, H₃C, N=N, N(C₂H₅)(C₂H₄CN)) (Clear red) | 100 | 0.21 | Substantially equal | Good |

TABLE 2-continued

| Example Nos. | Structural formula (Color) | Dyed fabric Surface density | Differences in color hue from standards — Difference in color hue (ΔE) | Visual evaluation | Fiber Surface condition |
|---|---|---|---|---|---|
| 20 | 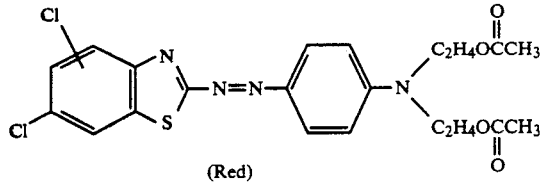 (Red) | 100 | 0.51 | Sunstantially equal | Good |
| 21 | 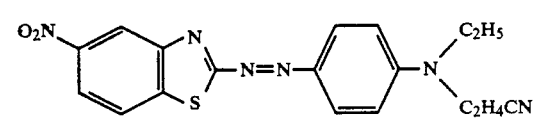 (Red) | 100 | 0.47 | Substantially equal | Good |
| 22 | 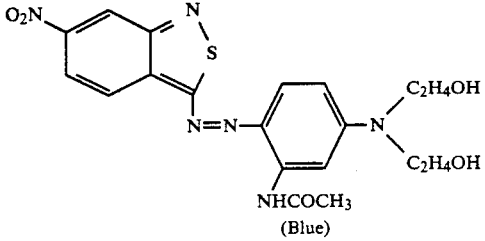 (Blue) | 100 | 0.52 | Substantially equal | Good |
| 23 | 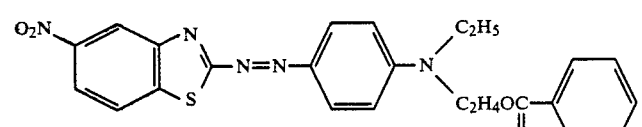 (Red) | 100 | 0.33 | Substantially equal | Good |
| 24 | 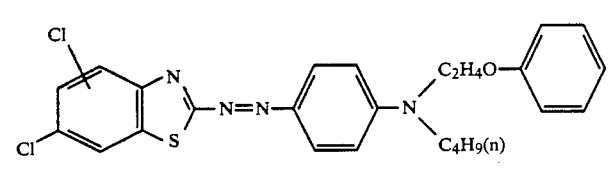 (Red) | 100 | 0.38 | Substantially equal | Good |
| 25 | 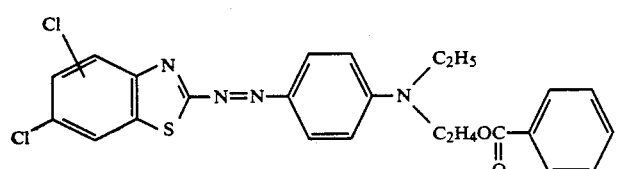 (Red) | 100 | 0.36 | Substantially equal | Good |
| 26 | 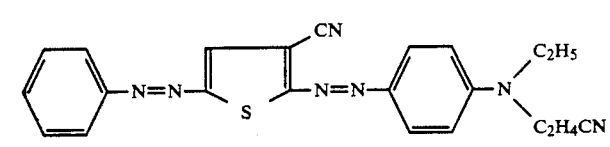 (Blue) | 100 | 0.25 | Substantially equal | Good |
| 27 | 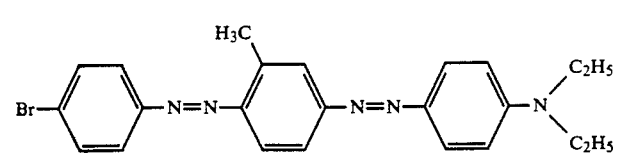 (Orange) | 100 | 0.33 | Substantially equal | Good |

TABLE 2-continued

| Example Nos. | Structural formula (Color) | Dyed fabric Surface density | Differences in color hue from standards Difference in color hue (ΔE) | Visual evaluation | Fiber Surface condition |
|---|---|---|---|---|---|
| 28 | O$_2$N—C$_6$H$_4$—N=N—(thiophene, CN, S)—N=N—C$_6$H$_4$—N(C$_4$H$_9$(n))(C$_2$H$_4$CN) (Blue) | 100 | 0.29 | Substantially equal | Good |
| 29 | Cl—C$_6$H$_4$—N=N—(thiophene, H$_3$C, CN, S)—N=N—C$_6$H$_4$—N(C$_2$H$_5$)(C$_2$H$_4$CN) (Blue) | 100 | 0.36 | Substantially equal | Good |
| 30 | O$_2$N—C$_6$H$_4$—N=N—C$_6$H$_3$(OCH$_3$)—N=N—C$_6$H$_4$—OH (Orange) | 100 | 0.41 | Substantially equal | Good |
| 31 | C$_6$H$_5$—N=N—(naphthalene)—N=N—C$_6$H$_4$—OH (Orange) | 100 | 0.31 | Substantially equal | Good |
| 32 | C$_6$H$_5$—N=N—C$_6$H$_4$—N=N—C$_6$H$_4$—N(C$_2$H$_5$)(C$_2$H$_4$CN) (Orange) | 100 | 0.17 | Substantially equal | Good |
| 33 | H$_3$C—C$_6$H$_2$(CN)(CN)—N=N—C$_6$H$_3$(NHSO$_2$CH$_3$)—N(C$_2$H$_5$)(C$_2$H$_5$) (Red) | 100 | 0.36 | Substantially equal | Good |
| 34 | O$_2$N—C$_6$H$_4$—N=N—C$_6$H$_4$—N(C$_2$H$_4$CN)(C$_2$H$_4$OC(O)C$_6$H$_5$) (Yellow) | 100 | 0.44 | Substantially equal | Good |
| 35 | (quinoline-OH fused with naphthalene-dione via CH) (Yellow) | 100 | 0.41 | Substantially equal | Good |

TABLE 2-continued
| Example Nos. | Structural formula (Color) | Surface density | Difference in color hue (ΔE) | Visual evaluation | Fiber Surface condition |
|---|---|---|---|---|---|
| 36 | 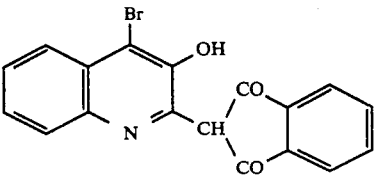 (Yellow) | 100 | 0.22 | Substantially equal | Good |
| 37 | 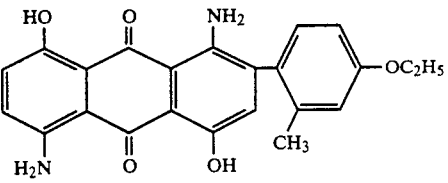 (Blue) | 100 | 0.50 | Substantially equal | Good |
| 38 | 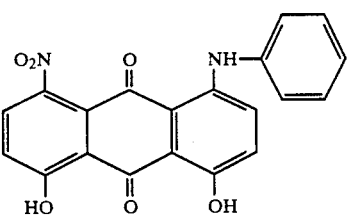 (Blue) | 100 | 0.33 | Substantially equal | Good |
| 39 | 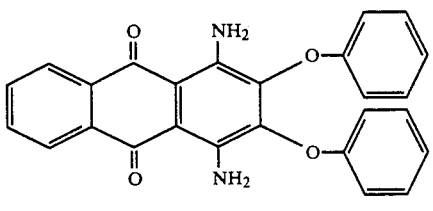 (Purple) | 100 | 0.25 | Substantially equal | Good |
| 40 | 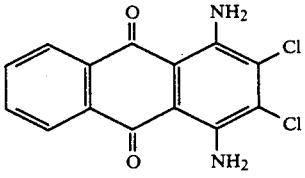 (Purple) | 100 | 0.31 | Substantially equal | Good |
| 41 | 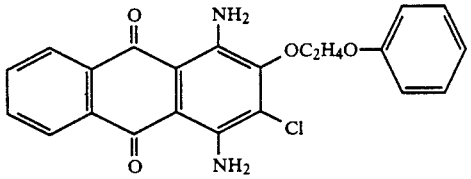 (Purple) | 100 | 0.29 | Substantially equal | Good |

TABLE 2-continued
| Example Nos. | Structural formula (Color) | Surface density | Difference in color hue (ΔE) | Visual evaluation | Fiber Surface condition |
|---|---|---|---|---|---|
| 42 | 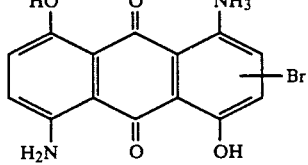<br>(Blue) | 100 | 0.29 | Substantially equal | Good |
| 43 | 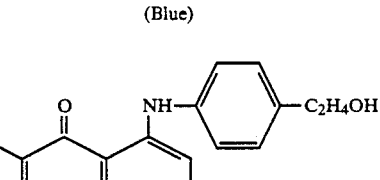<br>(Blue) | 100 | 0.42 | Substantially equal | Good |
| 44 | 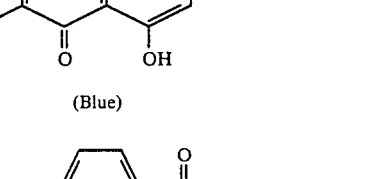<br>(Yellow) | 100 | 0.17 | Substantially equal | Good |
| 45 | 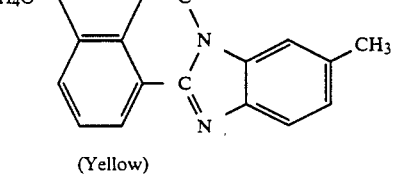<br>(Blue) | 100 | 0.36 | Substantially equal | Good |
| 46 | 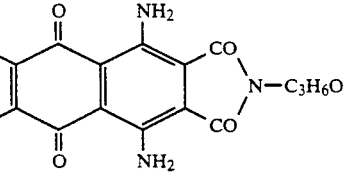<br>(Yellow) | 100 | 0.21 | Substantially equal | Good |
| 47 | 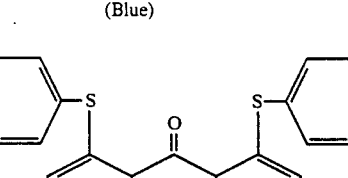<br>(Yellow) | 100 | 0.31 | Substantially equal | Good |

TABLE 2-continued

| Example Nos. | Structural formula (Color) | Dyed fabric Surface density | Differences in color hue from standards Difference in color hue (ΔE) | Visual evaluation | Fiber Surface condition |
|---|---|---|---|---|---|
| 48 | (Clear Yellow) | 100 | 0.31 | Substantially equal | Good |
| 49 | (Violet) | 100 | 0.16 | Substantially equal | Good |
| 50 | (Blue) | 100 | 0.22 | Substantially equal | Good |
| 51 | (Blue) | 100 | 0.33 | Substantially equal | Good |
| 52 | (Blue) | 100 | 0.27 | Substantially equal | Good |
| 53 | (Blue) | 100 | 0.41 | Substantially equal | Good |

TABLE 2-continued

| Example Nos. | Structural formula (Color) | Dyed fabric Surface density | Differences in color hue from standards Difference in color hue (ΔE) | Visual evaluation | Fiber Surface condition |
|---|---|---|---|---|---|
| 54 | 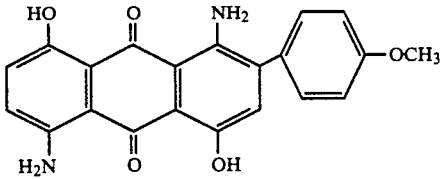 (Blue) | 100 | 0.21 | Substantially equal | Good |
| 55 | 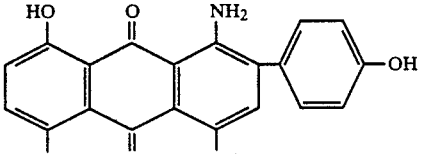 (Blue) | 100 | 0.26 | Substantially equal | Good |

EXAMPLES 56 AND 57, COMPARATIVE EXAMPLE 3 AND REFERENCE EXAMPLES 2 AND 3 (Dyeing of fiber mixtures)

By using 1% by weight, relative to the fabrics to be dyed, of a composition containing a disperse dye (orange) of the formula (D) prepared in the same manner as in Example 1 and 1% by weight, relative to the fabrics to be dyed, of a reactive dye (orange) of the formula (D), 5 g of a polyester fabric and 5 g of a cotton fabric were dyed at a dyeing temperature of 130° C. for 60 minutes in 200 ml of a dyeing bath containing 3 g/l of a leveling agent Diaserver ® DP-P Liquid (tradename, manufactured by Mitsubishi Kasei Corporation) and 0.4 g/l of an amino acid derivative or an amino acid as identified in Table 3 and having the pH adjusted to 9.5 with sodium hydroxide. Then, the fabrics were washed and dried in a usual manner to obtain dyed fabrics.

Further, as a standard for evaluation of the dyed fabrics, a dyeing bath was prepared in the same manner as above except that no amino acid derivative was used and soda ash was used as the alkali to adjust the pH to 9.5, and a cotton fabric was dyed in the same manner as above (Reference Example 2). Likewise, as a standard for evaluating the dyed fabrics, a dyeing bath was prepared in the same manner as above except that no amino acid derivative was used, and acetic acid and sodium acetate were used to adjust the pH to 5.0 (weakly acidic) which is commonly employed for dyeing polyester fibers, and a polyester fabric was dyed in the same manner as above (Reference Example 3).

By using the dyed fabrics obtained in Reference Examples 2 and 3 as the standards, evaluation of the dyed fabrics was conducted in the same manner as in Example 1. The results are shown in Table 3.

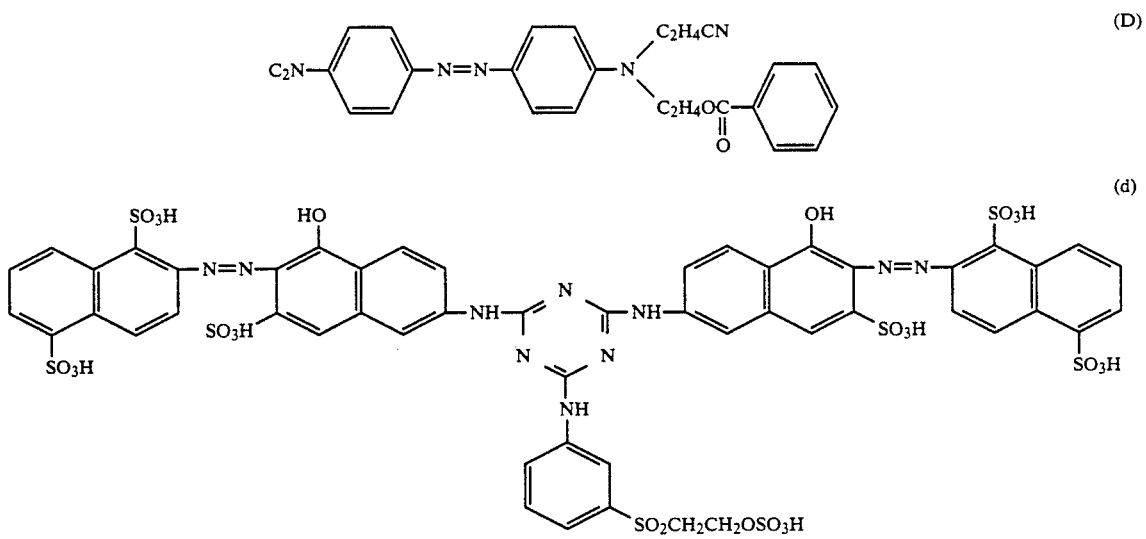

TABLE 3

| Examples | Dyeing conditions | | | Dyed fabrics (surface density %) | |
|---|---|---|---|---|---|
| | pH | Amino acid or its derivative | (g/l) | Alkali | Polyester | Cotton |
| Example 56 | 9.5 | N,N-bishydroxyethylglycine | 0.4 | NaOH | 100 | 100 |
| Example 57 | 9.5 | N,N-dimethylglycine | 0.4 | NaOH | 100 | 100 |
| Comparative Example 3 | 9.5 | Glycine | 0.4 | NaOH | 100 | 47 |
| Reference Example 2 (Standard) | 9.5 | — | — | Soda ash | — | 100 (Standard) |
| Reference Example 3 (Standard) | 5 | — | — | Acetic acid and sodium acetate* | 100 (Standard) | — |

*Acetic acid and sodium acetate: 0.2 g/l of acetic acid and 0.6 g/l of sodium acetate It is evident from the results of Examples 56 and 57 in Table 3 that when dyeing is conducted under an alkaline condition in the presence of an amino acid derivative by using both a disperse dye and a reactive dye, both polyester and cotton can be satisfactorily dyed. Thus, the method of the present invention is effective for dyeing a fiber mixture. Whereas, as is evident from Comparative Example 3, when dyeing is conducted in a similar manner in the presence of an amino acid such as glycine, the surface density of cotton tends to be substantially low, i.e. the percentage exhaustion tends to be substantially low. Thus, it is evident that it is practically impossible to dye a fiber mixture under an alkaline condition in the presence of an amino acid for commercial purposes.

EXAMPLES 58 TO 62, COMPARATIVE EXAMPLE 4 AND REFERENCE EXAMPLE 4

The disperse dye compositions containing disperse dyes of the formulas (A), (B) and (C), respectively, obtained in Example 1 were mixed in a weight ratio of 4:2:4 to obtain a mixture (black product) of the disperse dye compositions. By using this mixture in an amount of 4% by weight relative to the fabric to be dyed and using 0.5 g/l of a leveling agent Diaserver ® LR-PSL (tradename, manufactured by Mitsubishi Kasei Corporation) relative to the dyeing bath as a dyeing assistant and an amino acid as an additive in an amount as identified in Table 4, and adjusting the pH of the dyeing bath to 9.5 with an alkali as identified in Table 4, a non-scoured polyester fabric Tropical (tradename, manufactured by Toray Industries, Ltd.) was dyed in a bath ratio of 1:10 at a dyeing temperature of 130° C. for 60 minutes. Then, the fabric was washed and dried in a usual manner to obtain a dyed fabric.

As a Comparative Example, dyeing was conducted in the same manner as above except that sodium bicarbonate and soda ash were used as the alkali to maintain the pH of the dyeing bath to 9.5 and no amino acid was added (Comparative Example 4). Further, as a standard for evaluating the dyed fabric, a dyeing bath was prepared in the same manner as above except that no amino acid was used, and acetic acid and sodium acetate were used to adjust the pH to 5.0 (weakly acidic), which is commonly employed for dyeing polyester fibers, and dyeing was conducted in the same manner as above (Reference Example 4). By using the dyed fabric obtained in Reference Example 4 as the standard, evaluation of the dyed fabrics was conducted, and the results are shown in Table 4. The evaluation method of the dyed fabrics was the same as in Example 1.

TABLE 4

| Examples | Dyeing conditions | | | | Dyed fabric | | |
|---|---|---|---|---|---|---|---|
| | | | | | Surface density (%) | Differences in color hue form standars | |
| | pH | Amino acid | (g/l) | Alkali | | Difference in color hue (ΔE) | Visual evaluation |
| Example 58 | 9.5 | Glycine | 0.4 | NaOH | 99 | 0.38 | Slightly reddish |
| Example 59 | 9.5 | Glycine | 0.2 | NaOH | 100 | 0.24 | Slightly reddish |
| Example 60 | 9.5 | Glycine | 0.05 | NaOH | 100 | 0.20 | Slightly reddish |
| Example 61 | 9.5 | L-glutamic acid | 0.2 | NaOH | 99 | 0.32 | Slightly reddish |
| Example 62 | 9.5 | L-glutamic acid | 0.1 | NaOH | 100 | 0.15 | Slightly reddish |
| Comparative Example 4 | 9.5 | — | — | Sodium bicarbonate and soda ash*[1] | 90 | 10.77 | Reddish |
| Reference Example 4 (Standard) | 5.0 | — | — | Acetic acid and sodium acetate*[2] | 100 (Standard) | Standard | Standard |

*[1]Sodium bicarbonate and soda ash (anhydrous): 1 g/l of sodium bicarbonate and 0.15 g/l of soda ash
*[2]Acetic acid and sodium acetate: 0.2 g/l of acetic acid and 0.6 g/l of sodium acetate It is evident from Table 4 that as compared with Reference Example 4 wherein dyeing was conducted at pH 5.0 i.e. the conventional condition for dyeing polyester fibers, in Comparative Example 4 wherein dyeing was conducted at pH 9.5, the surface density is low, and the difference in color hue is substantial. Whereas in Examples 58 to 62 of the present invention, there is no substantial change in the surface density, and the difference in color hue is small by the presence of an amino acid even when the pH is 9.5.

We claim:
1. A method for dyeing polyester-containing fibers by using at least one disperse dye selected from the group consisting of axo type, anthraquinone type, phthalocyanine type, copper formazan type and quinophthalone type disperse dyes, wherein said dyeing is exhaustion dyeing conducted at 120° to 140° C. under an alkaline condition of pH 8 to 11 adjusted by an alkali metal hydroxide in an aqueous medium dyeing bath in the presence of at least one amino acid member selected from the group consisting of (a) neutral amino acids, (b) acidic amino acids, (c) basic amino acids, (d) alkali metal salts of said neutral amino acids, said acidic amino acids and said basic amino acids, and (e) amino acid derivatives, having at lest one hydrogen of the amino group of said neutral amino acids, said acidic amino acids, said basic amino acids and said alkali metal salts replaced with a $C_{1-4}$-alkyl, $C_{1-4}$-hydroxyalkyl or $C_{1-4}$-alkoxy-$C_{1-4}$-alkoxy-$C_{1-4}$-alkyl group, said amino acid member being present in an amount of from 0.02 to 0.8 g/l of the dyeing bath, provided that when a mixture of polyester fibers and cellulose fibers or natural or synthetic polyamide fibers is dyed in the same bath using a disperse dye and a reactive dye separately or a mixture of disperse and reactive dyes, the amino acid member is one selected from group (e) wherein both hydrogen atoms of the amino group are replaced with a $C_{1-4}$-alykl, $C_{1-4}$-hydroxyalkyl or $C_{1-4}$-alkoxy-$C_{1-4}$-alkyl group.

2. The method according to claim 1, wherein the polyester containing fibers are a fiber mixture of polyester fibers and cellulose fibers or natural or synthetic polyamide fibers, said amino acid member is an amino acid derivative having all hydrogen atoms of its amino group replaced with a $C_{1-4}$-alkyl, $C_{1-4}$-hydroxyalkyl or $C_{1-4}$-alkoxy-$C_{1-4}$-alkyl group and/or an alkali metal salt thereof, and the disperse dye is used in combination with a reactive dye.

3. The method according to claim 1, wherein said alkali metal hydroxide is sodium hydroxide.

4. The method according to claim 1, wherein the disperse dye is a monoazo dye or a disazo dye.

5. The method according to claim 1, wherein said amino acid member is selected from the group consisting of neutral amino acids, their alkali metal salts and their derivatives as defined in (e).

6. The method according to claim 1, wherein said amino acid member is selected from the group consisting of glycine, alanine, glutamic acid, their alkali metal salts and their derivatives as defined in (e).

7. The method according to claim 1, wherein said amino acid member is selected from the group consisting of glycine, glutamic acid, their alkali metal salts and their derivatives as defined in (e).

8. The method according to claim 1, wherein said amino acid member is selected from the group consisting of glycine, alanine, their alkali metal salts and their derivatives as defined in (e).

9. The method according to claim 1, wherein said amino acid member is selected from the group consisting of glycine, its alkali metal salts and its derivatives as defined in (e).

10. The method according to claim 1, wherein the substituent of the amino acid derivatives is $C_{1-4}$-alkyl or $C_{1-4}$-hydroxylalkyl.

11. The method according to claim 1, wherein the substituent of the amino acid derivatives is methyl or hydroxyethyl.

12. The method according to claim 1, wherein the substituent of the amino acid derivatives is hydroxyethyl.

13. The method according to claim 1, wherein the amino acid derivative is N,N-bishydroxyethylglycine.

14. The method according to claim 1, wherein the amino acid member is an amino acid derivative having all hydrogen atoms of its amino group replaced with $C_{1-4}$-alkyl, $C_{1-4}$-hydroxyalkyl or $C_{1-4}$-alkoxy-$C_{1-4}$-alkyl group.

15. The method according to claim 1, wherein the natural polyamide is wool or silk.

16. A dyeing assistant for dyeing polyester-containing fibers, which comprises: water; from 2 to 50% by weight, relative to the total amount of the composition, of at least one amino acid member selected from the group consisting of (a) neutral amino acids, (b) acidic amino acids, (c) basic amino acids, (d) alkali metal salts of said neutral amino acids, said acidic amino acids and said basic amino acids, and (e) amino acid derivatives having at least one hydrogen of the amino group of said neutral amino acids, said acidic amino acids, said basic amino acids and said alkali metal salts replaced with a $C_{1-4}$-alkyl, $C_{1-4}$-hydroxyalkyl or $C_{1-4}$-alkoxy-$C_{1-4}$-alkyl group, and from 0.5 to 10% by weight, relative to the total amount of the composition, of an alkali metal compound.

17. The dyeing assistant according to claim 16, wherein the alkali metal compound is sodium hydroxide.

18. The dyeing assistant according to claim 16, wherein the amino acid member is said amino acid derivative (e) and/or an alkali metal salt thereof.

19. The dyeing assistant according to claim 16, wherein the amino acid member is an amino acid derivative (e) having all hydrogen atoms of its amino group replaced with a $C_{1-4}$-alkyl, $C_{1-4}$-hyroxyalkyl or $C_{1-4}$-alkoxy-$C_{1-4}$-alkyl group.

20. The dyeing assistant according to claim 16, wherein said amino acid member is selected from the group consisting of neutral amino acids, their alkali metal salts and their derivatives as defined in (e).

21. The dyeing assistant according to claim 16, wherein said amino acid member is selected from the group consisting of glycine, alanine, glutamic acid, their alkali metal salts and their derivatives as defined in (e).

22. The dyeing assistant according to claim 16, wherein said amino acid member is selected from the group consisting of glycine, glutamic acid, their alkali metal salts and their derivatives as defined in (e).

23. The dyeing assistant according to claim 16, wherein the substituent of the amino acid derivatives (e) is $C_{1-4}$-alkyl or $C_{1-4}$-hydroxyalkyl.

24. The dyeing assistant according to claim 16, wherein the substituent of the amino acid derivatives (e) is methyl or hydroxyethyl.

25. The dyeing assistant according to claim 16, wherein the substituent of the amino acid derivatives (e) is hydroxyethyl.

26. The dyeing assistant according to claim 16, wherein the amino acid derivatives is N,N-bishydroxyethylglycine.

27. The dyeing assistant according to claim 16, which is a dyeing assistant for dyeing polyester-containing fibers by using a disperse dye by an exhaustion method under an alkaline condition in an aqueous medium.

28. The dyeing assistant according to claim 19, which is a dyeing assistant for dyeing a fiber mixture of polyester fibers and cellulose fibers or nitrogen-containing fibers by using a disperse dye and a reactive dye by an exhaustion dyeing method under an alkaline condition in an aqueous medium.

29. A method for dyeing polyester-containing fibers comprising contacting the fibers with at least one disperse dye selected from the group consisting of azo type, anthraquinone type, phthalocyanine type, copper formazan type and quinophthalone type disperse dyes, under exhaustion dyeing conditions comprising heating at a temperature of 120° to 140° C. in an aqueous medium dyeing bath at pH 8 to 11 adjusted by adding an alkali metal hydroxide, in the presence of at least one amino acid member selected from the group consisting of (a) glycine, alanine, aminobutyric acid, aminocaproic acid, asparagic acid, glutamic acid, lysine, and arginine; (b) alkali metal salts of the amino acids specified in (a); and (c) derivatives of the amino acids specified in (a) and (b) having at least one hydrogen of the amino replaced with a $C_{1-4}$-alkyl, $C_{1-4}$-hydroxyalkyl or $C_{1-4}$-alkoxy-$C_{1-4}$-alkyl group, said amino acid member being present in an amount of from 0.02 to 0.8 g/l of the dyeing bath, provided that when a mixture of polyester fibers and cellulose or polyamide fibers is dyed in the same bath using a mixture of disperse and reactive dyes, the amino acid member is one selected from group (e) wherein both hydrogen atoms of the amino group is replaced with a $C_{1-4}$-alkyl, $C_{1-4}$-hydroxyalkyl or $C_{1-4}$-alkoxy-$C_{1-4}$-alkyl group.

* * * * *